United States Patent [19]
Groebel et al.

[11] 3,873,699
[45] Mar. 25, 1975

[54] **PHARMACOLOGICALLY ACTIVE SUBSTANCES ISOLATED FROM *CADIA ELLISIANA***

[75] Inventors: Alfred Groebel, Bad Soden, Taunus; Ernst Lindner, Frankfurt am Main, both of Germany

[73] Assignee: Hoechst Aktiengesellschaft, Frankfurt am Main, Germany

[22] Filed: Aug. 27, 1973

[21] Appl. No.: 391,534

[30] Foreign Application Priority Data
Apr. 28, 1973   Germany............................ 2321566

[52] U.S. Cl. .............................................. 424/195
[51] Int. Cl. ........................................... A61k 27/14
[58] Field of Search .................................... 424/195

[56] References Cited
OTHER PUBLICATIONS

Van Laer et al., Chem. Abst., Vol. 75 (1971), page 1314r.

*Primary Examiner*—Sam Rosen
*Attorney, Agent, or Firm*—Curtis, Morris & Safford

[57] ABSTRACT

Method for isolating a pharmacologically active fraction from *Cadia ellisiana* by extraction of dried plant material. A first crystalline substance, found in said active fraction, having a hypotensive and anti-arrhythmic action. A second crystalline substance, found in said active fraction, having a hypotensive action. Pharmaceutical dosage unit forms containing these compounds. Methods of treating hypertonia and/or arrhythmia with these compouds.

8 Claims, 2 Drawing Figures

FIG. I

PHARMACOLOGICALLY ACTIVE SUBSTANCES ISOLATED FROM CADIA ELLISIANA

The present invention relates to pharmacologically active substances and to their isolation from *Cadia ellisiana*.

*Cadia ellisiana* is a shrub which belongs to the family of Leguminosae and occurs in the forests of the East Coast of Madagascar.

Now, we have found that this plant contains two crystalline substances which have a long-lasting hypotensive action with practically constant venous pressure, with low reduction of the heart frequency and with simultaneous increase of the blood flow of the peripheral vessels. Further, one of these two substances also has an anti-arrhythmic action.

Two figures are presented in this application,

Figure 1:
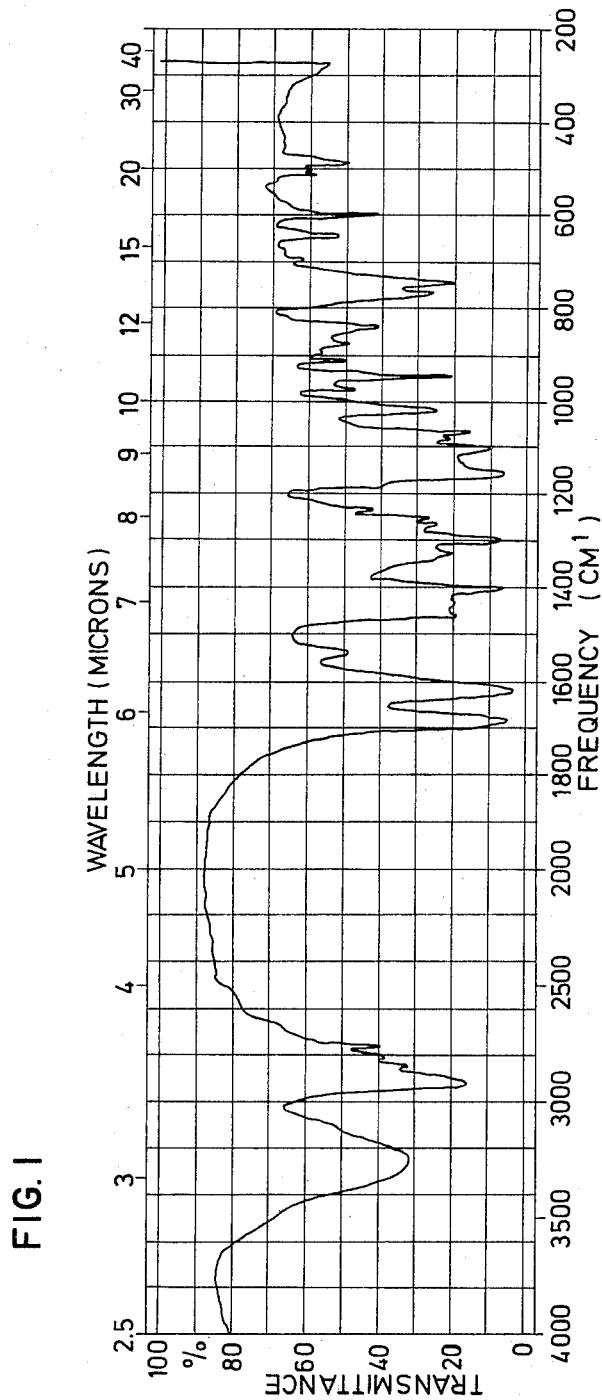
FIG. 1 shows the infrared spectrum of Substance 1.

Accordingly, the objects of the present invention are these substances and their physiologically tolerated salts, processes for isolating them and pharmaceutical preparations containing said substances as active ingredients.

The said substances are obtained by extracting, with water or with an organic solvent, dried material of *Cadia ellisiana*, preferably the roots, optionally after a previous extraction with petroleum ether in order to remove fats, waxes and sterols, purifying the extract by fractionation and optionally converting it into physiologically tolerated salts.

It is particularly advantageous to effect the purification of the crude extract by freeing it from solvent, extracting the dry residue with dilute acids, rendering the acid solution alkaline, extracting by shaking the alkaline solution with a lower aliphatic halogenohydrocarbon or an aromatic hydrocarbon, drying the organic solution and subjecting the residue to chromatographic purification.

The active substances are present mainly in the roots of *Cadia ellisiana*. The leaves and stems have a considerably lower content of the substances than the roots. It is advisable to eliminate at first the main quantity of the accompanying substances such as fats, waxes and sterols by a pre-extraction. For the main extraction of the active substances, there may be used, in addition to water, also solvents such as lower alcohols, lower aliphatic halogeno-hydrocarbons, acetone, benzene, dioxane, tetrahydrofurane, ethyl acetate, dimethylformamide, dimethyl sulfoxide or pyridine.

Especially advantageous extracting agents are lower alcohols such as methanol and ethanol, or aliphatic halogeno-hydrocarbons of one to three carbon atoms and up to three chlorine atoms, for example chloroform and dichloromethane. According to a preferred mode of operation of the process of the invention, the crude extract is subsequently freed in known manner from solvent, for example by removing the solvent by distillation under reduced pressure or under normal pressure. The last residues of solvent can be removed by drying in a drier.

The active substances are then extracted from the solid residue by treatment with a dilute acid. For example hydrochloric acid, sulfuric acid, nitric acid and acetic acid are suitable. In particular, hydrochloric acid or sulfuric acid is used. The acids are preferably 0.1N to 2N. The use of higher concentrations entails the disadvantage that higher proportions of decomposition products and therewith impurities enter the extracts.

The acid solution is then rendered alkaline, the optimum pH-value being between 8 and 9. For alkalinization, preferably sodium or potassium hydroxide solution or ammonia is used. The alkaline solution is extracted with a lower aliphatic halogeno-hydrocarbon, for example chloroform or dichloromethane, or with an aromatic hydrocarbon, for example benzene.

The organic solution is separated from the aqueous solution and, after drying, evaporated under reduced pressure or under normal pressure. After evaporation, there is obtained a residue which is the carrier of the strong hypotensive action. For further purification, it can be subjected, for example, to adsorption chromatography. For this purpose, the residue is distributed on the adsorbent, for example from a chloroform solution. As an adsorbent, preferably silica gel or aluminium oxide is used. As an eluant, lower alcohols or esters of lower alcohols with lower aliphatic acids, or mixtures of lower alcohols and these esters with addition of basic compounds, for example dimethylformamide, are particularly suitable or diethylamine. Chromatography then yields two different, consecutively-separated, eluates.

Upon evaporation of the eluates, two odorless crystalline substances are obtained. They can be further purified and obtained in pure form by recrystallization from a lower alcohol, for example methanol, ethanol and propanol or from acetone. The substances are characterized by the following physico-chemical properties:

Substance 1: Colorless rodlets

Melting point: 178° C (after drying at 50° C under highly reduced pressure over $CaCl_2$)

Molecular weight: 357 (determined osmometrically in methanol and by mass spectrometry)

Quantitative elementary analysis:

| | |
|---|---|
| C | 67.2% |
| H | 7.6% |
| N | 11.8% |
| O | 13.4% |

This gives the empirical formula: $C_{20}H_{27}N_3O_3$

Thin-layer chromatography (adsorbent: $SiO_2-F_{254}$).

| System: | |
|---|---|
| 96% ethanol | 8 |
| n-butylacetate | 45 |
| dimethylformamide | 3 |
| diethylamine | 1 |

$R_f$-value: 0.52

Ultraviolet spectrum: $\lambda_{max} = 268$ m$\mu$, log $\epsilon = 4.924$ (in methanol)

Optical rotation: $[\alpha]_{20}^D = +80°$ (in chloroform)

The reactions with Dragendorff reagent (bismuth carbonate + sodium iodide in glacial acetic acid and ethyl acetate, addition of tartaric acid) and iodine platinate (5% hexachloro-platinic acid + potassium iodide in water) were positive.

The infrared spectrum (1 mg of substance of 300 mg of KBr) is shown in FIG. 1.

Substance 2: Colorless needles

Melting point: 170° C (after drying at 50° C under highly reduced pressure over $CaCl_2$)

Molecular weight: 264 (determined osmometrically in acetone and by mass spectrometry).
Quantitative elementary analysis:

| | |
|---|---|
| C | 68.4% |
| H | 9.0% |
| N | 10.4% |
| O | 12.2% |

This gives the empirical formula: $C_{15}H_{24}N_2O_2$

Thin-layer chromatography (adsorbent: $SiO_2-F_{254}$):

| System: | | |
|---|---|---|
| | 96% ethanol | 8 |
| | n-butylacetate | 45 |
| | dimethylformamide | 3 |
| | diethylamine | 1 |

$R_f$-value: 0.15

Ultraviolet spectrum: $\lambda_{max} = 270$ m$\mu$, log $\epsilon = 3.61$ (in methanol)

Optical rotation: $[\alpha]_{20}^D = +68°$ (in water)

Figure 2:
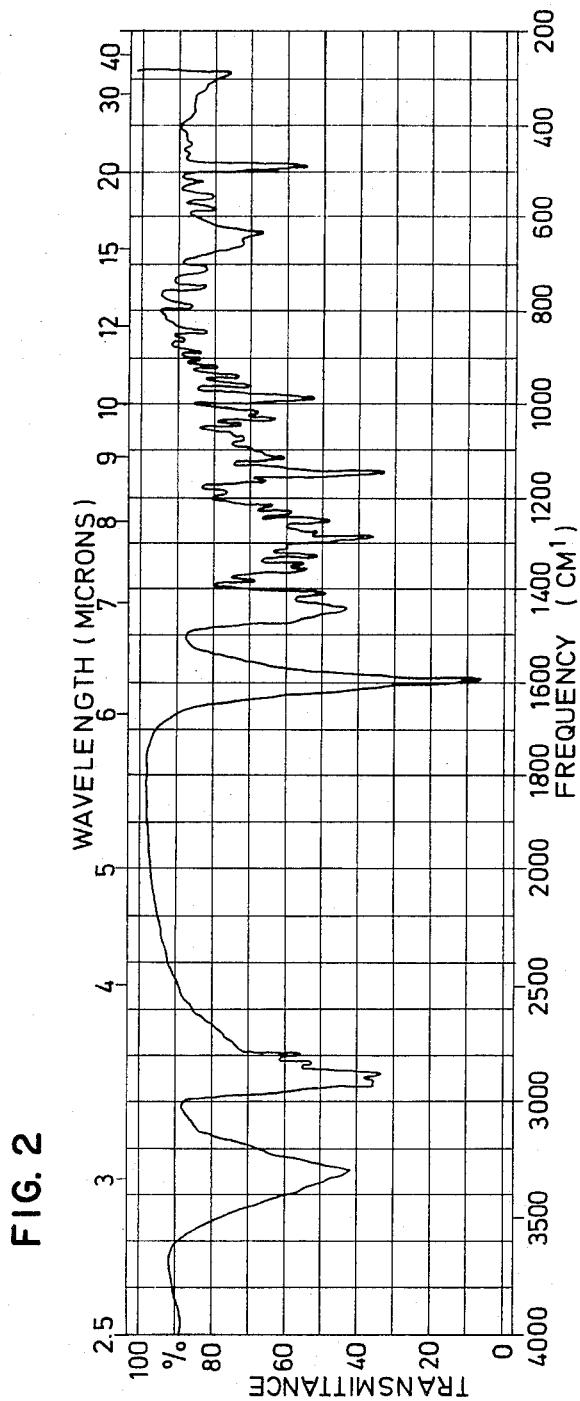
FIG. 2 shows the infrared spectrum of Substance 2. These substances are further defined hereinafter.

The infrared spectrum (1 mg of substance in 300 mg of KBr) is shown in FIG. 2.

The reactions with Dragendorff reagent (bismuth carbonate + sodium iodide in glacial acetic acid and ethyl acetate, addition of tartaric acid) and iodine platinate (5% hexachloroplatinic acid + potassium iodide in water) were positive.

Conversion of the substances into physiologically tolerated salts is carried out according to known methods. For example, dissolution of the substances in acetone and introduction of hydrogen chloride gas into these solutions yields the chlorhydrates. As further suitable salts, there may be mentioned the phosphate, lactate, sulfate, citrate, tartrate, maleinate, glycolate and gluconate.

The substances are distinguished by a very good hypotensive action:

Substance 1: The substance has a very good hypotensive action even when administered in a very small dose. For example, in a dog anesthetized with pentobarbital, 0.25 mg/kg lower the blood pressure from 200/100 mm Hg to 120/55 mm Hg. This action lasts for more than 1 hour. The heart frequency is reduced from 165 beats/minute to 105 beats/minute, although in general the heart frequency is reflexly increased when the pressure is reduced. This inhibition of the normal reflex can be considered as very positive, because in many cases this reflexly produced increase of the heart frequency annuls the therapeutic effect of hypotensive substances and is, moreover, subjectively felt as uneasy.

The preparation also has a very good action when administered parenterally. 1 mg/kg thereof administered intra-duodenally to a dog anesthetized with pentobarbital produce a distinct and long-lasting lowering of the blood pressure: within 20 minutes, the blood pressure falls slowly from 160/125 mm Hg to 100/70 mm Hg. This action is maintained for more than 1 hour.

Substance 2: With dogs anesthetized with pentobarbital, 2 mg/kg administered intravenously already produced a distinct reduction of the blood pressure (for example, from 200 mm Hg systolic/100 mm Hg diastolic to 150/80 mm Hg). The heart frequency falls or remains constant, although in general the heart frequency is reflexly increased when the pressure is reduced. This inhibition of the normal reflex can be considered as being very positive, because in many cases this reflexly produced increase of the heart frequency annuls the therapeutic effect of hypotensive substances and is, moreover, felt subjectively as uneasy.

The peripheral blood flow is increased to about double after administration of the above-mentioned does (measured in the Arteria femoralis).

The blood pressure reaches its initial value 1 hour after administration of the mentioned dose.

When administered intra-duodenally, already 5 mg/kg produce a lowering of the systolic and diastolic pressure with distinctly reduced heart frequency and increase of the peripheral blood flow. The pressure falls, for example from 165/110 to 154/105 mm Hg.

Upon intra-duodenal administration of 10 mg/kg, the blood pressure falls, for example from 140/110 to 80/60 mm Hg, the heart frequency is reduced from 123 beats/min. to 86 beats/min. The peripheral blood flow is increased to about double. Upon intraduodenal administration, the effect lasts for more than 60 minutes.

In the hypertensive rat anesthetized with hexobarbital, too, the preparation showed a hypotensive action: 2 mg/kg of substance, administered intravenously, lower the blood pressure from 225/205 to 210/185 mm Hg; 4 mg/kg lower, for example from 235/220 to 210/185 mm Hg or, in other tests, from 165/150 to 130/120 mm Hg.

Substance 1 in addition has a very good anti-arrhythmic action which was determined in the dog as follows:

K-strophanthin was at first infused until extra-systoles occurred. Then, the preparation of the invention was administered intravenously in a dose of 0.2 mg/kg. As soon as 60 seconds after the administration, the extra-systoles had disappeared and did not reoccur in the course of more than 1 hour.

In isolated Guinea pigs' hearts perfused according to Langendorff, the preparation when administered in a prophylactic dose also showed a strong fibrillation-inhibiting action. With the control hearts, fibrillation was observed in 8 of 10 hearts after introduction of 25 $\mu$g of aconitine and 25 $\mu$g of digitoxin into the infusion canula to the heart. When 6 $\mu$g of substance 1 were added, only 2 of 10 hearts fibrillated. The difference to the control value is significant with a P of 0.001. The substance was compared with the anti-arrhythmic agent Ajmalin. When 60 $\mu$g of Ajmalin were administered, 3 out of 10 hearts fibrillated. Thus, substance 1 has an about 10 times stronger anti-arrhythmic action than Ajmalin.

Accordingly, the anti-arrhythmic action already sets in at doses which are essentially lower than those necessary with comparable preparations that have an anti-arrhythmic action. Therefore, the substance appears to be suitable for the treatment of arrhythmias.

By reason of their pharmacological properties, the new substances are suitable for the treatment of all forms of hypertonia, i.e. essential as well as renal hypertonias. In addition, substance 2 may be used in the treatment of disorders of the peripheral blood circulation. For these indications, an effect can already be observed with doses which are smaller than those above-indicated. Substance 1 may furthermore be used as an anti-arrhythmic agent.

For oral administration, there may be used in particular tablets or dragees which contain the free active substance 1 or 2 or one of its salts and the usual excipients and adjuvants such as talc, starch, lactose, and so on. As dosages, there may be used:
substance 1: 60 mg/dose to be administered
substance 2: 300 mg/dose to be administered.

For intravenous administration, solutions of substance 1 or 2 in water or propylene-glycol or solutions of physiologically tolerated salts in water are preferable used.

The following examples illustrate the invention.

EXAMPLE 1

920 g of ground crude material (roots) of *Cadia ellisiana* were degreased with petroleum ether and then extracted with dichloromethane. The extract was filtered and evaporated under reduced pressure. Yield of crude extract: 181 g.

The dry residue was stirred with 600 ml of 0.2N-sulfuric acid. The acid solution (pH 3.8) was filtered and the filtrate was adjusted to pH 9 by means of 2N sodium hydroxide solution. The alkaline solution was extracted with a total of 1.2 liters of dichloromethane. The organic phase was separated from the aqueous phase, dried over sodium sulfate and evaporated under reduced pressure. Yield of residue: 21 g.

The product was then applied from a chloroform solution on 20 g of aluminium oxide (neutral). The adsorbate was introduced from chloroform into a column (diameter about 1.5 cm) of 200 g of the same adsorbent and chromatographed. Chromatography was carried out with a mixture of

| 96% ethanol | 4 |
| ethyl acetate | 15 |
| dimethylformamide | 3 |
| diethylamine | 1 | and observed by thin-layer chromatography. Fractions of 35 ml each were collected. Fractions 20–26 contained the substance 1, fractions 97–119 contained the substance 2. The substances crystallized in the corresponding combined fractions and were recrystallized separately from ethanol.

Substance 1: colorless rodlets, melting point: 178°C. Yield: 1.12 g.
Substance 2: colorless needles, melting point: 170°C. Yield: 3.67 g.

EXAMPLE 2

32.88 Kg of ground crude material (roots) of *Cadia ellisiana* were degreased with petroleum ether and then extracted with methanol. The extract was filtered and dried under reduced pressure. Yield of crude extract: 8.21 kg.

The dry residue was stirred with 20 liters of 0.5N hydrochloric acid at room temperature. After filtration, the hydrochloric solution (pH 3.1) was adjusted to pH 8.8 with concentrated ammonia ($d = 0.91$). The alkaline solution was shaken with a total of 100 liters of chloroform. The chloroform solution was dried over sodium sulfate, filtered and evaporated under reduced pressure. Yield of residue: 795 g.

The product was applied from a chloroform solution to 1 kg of silica gel (grain size 0.05 to 0.2 mm). The adsorbate was introduced in chloroform into a column (diameter 10 cm, length 175 cm) of 5 kg of the same adsorbent. Chromatography was carried out with a mixture of

| 96% ethanol | 8 liters |
| n-butylacetate | 45 liters |
| dimethylformamide | 3 liters |
| diethylamine | 1 liters |

Fractions of 2 liters each were collected. Fractions 7–9 contained the substance 1, fractions 19–29 contained the substance 2. Corresponding fractions were combined. The substances crystallized from the solutions and were recrystallized from acetone.

Substance 1: colorless rodlets, melting point 178°C. Yield: 42.8 g.
Substance 2: colorless needles, melting point 170°C. Yield: 142.1 g.

We claim:

1. A pharmacologically active substance isolated from *Cadia ellisiana*, and its physiologically tolerated salts, said substance having the following properties:

| Empirical formula: | $C_{20}H_{27}N_3O_3$ |
| Melting point: | 178°C. |
| Molecular weight: | 375 (determined mass spectrographically and osmometrically in methanol) |
| Optical rotation: | $[\alpha]_{20}^D = +80°$ (in chloroform) |
| Ultraviolet spectrum: | $\lambda_{max}$ at 268 m$\mu$, log $\epsilon$ = 4.924 (in methanol) |
| Infrared spectrum: | as in FIG. 1 of the drawings (in KBr). |

2. A pharmacologically active substance isolated from *Cadia ellisiana*, and its physiologically tolerated salts, said substance having the following properties:

| Empirical formula: | $C_{15}H_{24}N_2O_2$ |
| Melting point: | 170°C. |
| Molecular weight: | 264 (determined mass spectrographically and osmometrically in acetone) |
| Optical rotation: | $[\alpha]_{20}^D = +68°$ (in water) |
| Ultraviolet spectrum: | $\lambda_{max}$ at 270 m$\mu$, log $\epsilon$ = 3.61 (in methanol) |
| Infrared spectrum: | as in FIG. 2 of the drawings (in KBr). |

3. A pharmaceutical dosage unit form for oral administration in the treatment of hypertonia comprising 60 mg/dose of a compound as in claim 1 and a pharmaceutical excipient.

4. A pharmaceutical dosage unit form for oral administration in the treatment of hypertonia comprising 300 mg/dose of a compound as in claim 2 and a pharmaceutical excipient.

5. The method of treating hypertonia or arrhythmia in a patient suffering therefrom which comprises orally administering 60 mg of a compound as in claim 2.

6. The method of treating hypertonia or arrhythmia in a patient suffering therefrom which comprises intravenously administering 0.20–0.25 mg/kg of a compound as in claim 2.

7. The method of treating hypertonia in a patient suffering therefrom which comprises orally administering 300 mg of a compound as in claim 3.

8. The method of treating hypertonia in a patient suffering therefrom which comprises intravenously administering 2 mg/kg of a compound as in claim 3.

* * * * *